United States Patent [19]

Harrison et al.

[11] Patent Number: 5,319,030

[45] Date of Patent: Jun. 7, 1994

[54] ONE-STEP PROCESS FOR THE PREPARATION OF ALKENYL SUCCINIC ANHYDRIDE

[75] Inventors: James J. Harrison, Novato; William R. Ruhe, Jr., Benicia, both of Calif.

[73] Assignee: Chevron Research and Technology Company, San Francisco, Calif.

[21] Appl. No.: 919,342

[22] Filed: Jul. 23, 1992

[51] Int. Cl.$^5$ .................. C08F 255/10; C10M 145/16
[52] U.S. Cl. .................................. 525/285; 525/319; 252/56 D
[58] Field of Search ............................... 525/285, 319

[56] References Cited

U.S. PATENT DOCUMENTS

| | | | |
|---|---|---|---|
| 3,172,892 | 3/1965 | Le Suer et al. | 260/326.8 |
| 3,219,666 | 11/1965 | Norman et al. | 260/268 |
| 3,361,673 | 1/1968 | Stuart et al. | 252/51.5 |
| 3,367,864 | 2/1968 | Elliott et al. | 252/32.7 |
| 3,381,022 | 4/1968 | Le Suer | 260/404.8 |
| 4,234,435 | 11/1980 | Meinhardt et al. | 252/51.5 |
| 4,873,004 | 10/1989 | Beverwijk et al. | 252/32.5 |
| 5,137,975 | 8/1992 | Kelusky | 525/285 |

FOREIGN PATENT DOCUMENTS 0355895 2/1990 European Pat. Off. .
9003359 4/1990 PCT Int'l Appl. .

Primary Examiner—Vasu S. Jagannathan
Attorney, Agent, or Firm—Claude J. Caroli

[57] ABSTRACT

A process for the preparation of an alkenyl-substituted succinic anhydride wherein the alkenyl substituent has a number average molecular weight of from about 500 to 5000 and the average number of succinic groups per alkenyl group is greater than 1.2 which comprises reacting a polyolefin having an alkylvinylidene isomer content of less than about 10 percent and a number average molecular weight of about 500 to 5000 with maleic anhydride in the presence of a free radical initiator at a temperature in the range of about 80° C. to 220° C. for a period of less than 20 hours, wherein the molar ratio of maleic anhydride to polyolefin is about 1.0:1 to 9:1, and wherein the half-life of the decomposition of the free radical initiator is about 5 minutes to 10 hours at the reaction temperature.

16 Claims, No Drawings

ONE-STEP PROCESS FOR THE PREPARATION OF ALKENYL SUCCINIC ANHYDRIDE

BACKGROUND OF THE INVENTION

The present invention relates to a process for preparing compositions which are useful as intermediates for dispersants used in lubricating oil compositions or as dispersants themselves. In addition, some of the compositions prepared by the present process are useful in the preparation of high molecular weight dispersants which have superior dispersant properties for dispersing sludge and varnish. Such high molecular weight dispersants also advantageously impart fluidity modifying properties to lubricating oil compositions which are sufficient to allow elimination of some proportion of viscosity index improver from multigrade lubricating oil compositions which contain these dispersants.

It is known in the art that alkenyl-substituted succinic anhydrides have been used as dispersants. Such alkenyl-substituted succinic anhydrides have been prepared by two different processes, a thermal process (see, e.g., U.S. Pat. No. 3,361,673) and a chlorination process (see e.g., U.S. Pat. No. 3,172,892). The polyisobutenyl succinic anhydride ("PIBSA") produced by the thermal process has been characterized as a monomer containing a double bond in the product. Although the exact structure of chlorination PIBSA has not been definitively determined, the chlorination process PIBSA materials have been characterized as monomers containing either a double bond, a ring other than succinic anhydride ring and/or chlorine in the product. [(See J. Weill and B. Sillion, "Reaction of Chlorinated Polyisobutene with Maleic Anhydride: Mechanism Catalysis by Dichloramaleic Anhydride", Revue de l'Institut Francais du Petrole, Vol. 40, No. 1, pp. 77–89 (January–February, 1985).] Such compositions include one-to-one monomeric adducts (see, e.g., U.S. Pat. Nos. 3,219,666; 3,381,022) as well as adducts having polyalkenyl-derived substituents adducted with at least 1.3 succinic groups per polyalkenyl-derived substituent (see, e.g., U.S. Pat. No. 4,234,435).

Commonly assigned International Patent Application No. PCT/US89/04270, Publication No. WO 90/03359, dated Apr. 5, 1990 and entitled "Novel Polymeric Dispersants Having Alternating Polyalkylene and Succinic Groups" discloses copolymers prepared by reacting an unsaturated acidic reactant, such as maleic anhydride, with a high molecular weight olefin, such as polyisobutene, in the presence of a free radical initiator, wherein at least about 20 percent of the total high molecular weight olefin comprises an alkylvinylidene isomer and wherein the high molecular weight olefin has a sufficient number of carbon atoms such that the resulting copolymer is soluble in lubricating oil.

U.S. Pat. No. 4,234,435 to Meinhardt et al., assigned to The Lubrizol Corporation, discloses substituted succinic acylating agents derived from polyalkenes, such as polybutene, and a dibasic carboxylic reactant, such as maleic acid or anhydride, wherein the polyalkenes have a number average molecular weight of about 1300 to 5000 and a ratio of weight average to number average molecular weight of about 1.5 to 4. These acylating agents are further characterized by the presence of an average of at least 1.3 succinic groups for each equivalent weight of substituent group. Meinhardt et al. teach that such acylating agents are prepared by heating the polyalkene and carboxylic reactant with chlorine in a one-step process or, alternatively, by first reacting the polyalkene with chlorine and then reacting the resulting chlorinated polyalkene with the carboxylic reactant. This patent further teaches that such substituted succinic acylating agents and their derivatives are useful lubricating oil dispersant additives which also exhibit viscosity index improving properties.

U.S. Pat. No. 4,873,004 to Beverwijk et al., assigned to Shell Oil Company, discloses an alkyl or alkenyl-substituted succinic anhydride, wherein the alkyl or alkenyl group on the anhydride has a number average molecular weight of from 600 to 1300 and wherein the average number of succinic groups per alkyl or alkenyl group is between 1.4 and 4.0. Beverwijk et al. teach that these alkyl or alkenyl-substituted succinic anhydrides can be prepared by mixing a polyolefin with maleic anhydride and passing chlorine through the mixture, or by reacting a chlorinated polyolefin with maleic anhydride. Beverwijk et. al. further teach that the succinimide derivatives of such substituted succinic anhydrides are useful dispersant additives for lubricating oils.

U.S. Pat. No. 3,367,864 to Elliot et al., assigned to Castrol Limited, discloses in Example I thereof the preparation of a polyisobutenyl succinic anhydride by the reaction of about a 1:1 molar ratio of polyisobutylene and maleic anhydride in refluxing toluene and in the presence of a di-tertiary-butyl peroxide free radical initiator. Elliot et al. further teach that the succinic anhydride product produced by this method is similar to the product obtained by thermally reacting polyisobutylene and maleic anhydride at 240° C. for 30 hours.

It has generally been recognized in the art that the polyisobutenyl succinic anhydride prepared by employing a conventional thermal process is primarily a monomeric one-to-one adduct, that is, having about one succinic group per polyisobutenyl group in the product. However, recent analysis of a number of polyisobutenyl succinic anhydride products produced by following the free radical-initiated process of Example I of U.S. Pat. No. 3,367,864 has resulted in a finding that such products are monomeric adducts containing an average of about 1.6 or greater succinic groups per polyisobutenyl group.

Moreover, European Patent Application Publication No. 0,355,895 A2, published Feb. 28, 1990, discloses a process for the preparation of polyolefin-substituted succinic anhydrides in which the average molar ratio of succinic groups to polyolefin chains is greater than 1.3 to 1, which comprises heating a polyolefin with at least a molar excess of maleic anhydride, wherein the polyolefin employed contains at least 70 percent of the terminal groupings in a structure having an alpha olefinic bond or structures in equilibrium with such alpha olefinic structures. Thus, this European patent application teaches that greater than 1.3 succinic groups per polyolefin group can be obtained when the polyolefin employed is one wherein the predominant isomer is an alkylvinylidene.

SUMMARY OF THE INVENTION

The present invention is directed to a one-step process for the preparation of an alkenyl-substituted succinic anhydride wherein the alkenyl substituent has a number average molecular weight of from about 500 to 5000 and the average number of succinic groups per alkenyl group is greater than 1.2 which comprises reacting a polyolefin having an alkylvinylidene isomer content of less than about 10 percent and a number average molecular weight of about 500 to 5000 with maleic anhydride in the presence of a free radical initiator at a temperature in the range of about 80° C. to 220° C. for a period of less than 20 hours, wherein the molar ratio of maleic anhydride to polyolefin is about 1.0:1 to 9:1, and wherein the half-life of the decomposition of the free radical initiator is about 5 minutes to 10 hours at the reaction temperature.

Among other factors, the present invention is based on the discovery that certain alkenyl-substituted succinic anhydrides containing an average of greater than 1.2 succinic groups per alkenyl group can be effectively prepared in high yields and conversions at shorter reaction times by employing a unique one-step process which does not involve the use of chlorine, thereby resulting in a product having improved environmental properties.

The average number of succinic groups per alkenyl group in the alkenyl succinic anhydride produced by the present process is greater than 1.2, preferably at least about 1.3, more preferably from about 1.3 to 4.0, and most preferably from about 1.3 to about 2.5.

Suitable polyolefins for use in preparing the alkenyl succinic anhydride products will have a number average molecular weight of about 500 to 5000, preferably from about 700 to 3000, and more preferably, from about 900 to 2500. Generally, such polyolefins will contain at least about 35 carbon atoms, preferably about 50 carbon atoms or greater. Preferred polyolefins are polybutene and polypropylene, particularly polyisobutene. Suitable polyolefins will also contain an alkylvinylidene isomer content of less than about 10 percent.

The succinic anhydride products prepared by the process of the invention are useful as dispersants themselves and also as intermediates in the preparation of other dispersant additives having improved dispersancy and/or detergency properties when employed in a lubricating oil.

The products produced by the instant process can also be used to form polysuccinimides which are prepared by reacting the alkenyl succinic anhydride with a polyamine to give a polysuccinimide. These polysuccinimides are useful as dispersants and/or detergents in fuels and oils. In addition, these polysuccinimides have advantageous viscosity modifying properties, and may provide a viscosity index credit ("V.I. Credit") when used in lubricating oils, which may permit elimination of some portion of viscosity index improver ("V.I. Improver") from multigrade lubricating oils containing the same.

Moreover, the succinic anhydrides prepared by the present process can be employed to make modified polysuccinimides wherein one or more of the nitrogens of the polyamine component is substituted with a hydrocarbyl oxycarbonyl, a hydroxyhydrocarbyl oxycarbonyl or a hydroxy poly(oxyalkylene)-oxycarbonyl. These modified polysuccinimides are improved dispersants and/or detergents for use in fuels or oils.

Accordingly, the alkenyl succinic anhydrides made by the present process are useful in providing a lubricating oil composition comprising a major amount of an oil of lubricating viscosity and an amount of a succinic anhydride, polysuccinimide or modified succinimide additive sufficient to provide dispersancy and/or detergency. These additives may also be formulated in lubricating oil concentrates which contain about 10 to about 50 weight percent of the additive.

Furthermore, the alkenyl succinic anhydrides formed by the present process can be used to provide a fuel composition comprising a major portion of a fuel boiling in a gasoline or diesel range and an amount of succinic anhydride, polysuccinimide or modified succinimide additive sufficient to provide dispersancy and/or detergency. These additives can also be used to make fuel concentrates comprising an inert stable oleophilic organic solvent boiling in the range of about 150° F. to about 400° F. and from about 5 to about 50 weight percent of such additive.

DETAILED DESCRIPTION OF THE INVENTION

The high molecular weight polyolefins used in the preparation of the instant alkenyl succinic anhydrides are of sufficiently long chain length so that the resulting composition is soluble in and compatible with mineral oils, fuels and the like. Thus, the polyolefin will typically contain about 35 carbon atoms or greater, preferably about 50 carbon atoms or greater.

Such high molecular weight polyolefins are generally mixtures of molecules having different molecular weights and can have at least one branch per 6 carbon atoms along the chain, preferably at least one branch per 4 carbon atoms along the chain, and move preferably about one branch per 2 carbon atoms along the chain. These branched chain olefins may conveniently comprise polyalkenes prepared by the polymerization of olefins of from 3 to 6 carbon atoms, and preferably from olefins of from 3 to 4 carbon atoms, and more preferably from propylene or isobutylene. The addition-polymerizable olefins employed are normally 1-olefins. The branch may be of from 1 to 4 carbon atoms, more usually of from 1 to 2 carbon atoms and preferably methyl.

The polyolefins employed in the process of the present invention may be prepared by conventional techniques well known in the art, such as aluminum chloride-catalyzed polymerization of lower olefins.

Preferred polyolefins are polyisobutenes having number average molecular weights of about 500 to about 5000, more preferably about 700 to about 3000. Especially preferred are those polyisobutenes having number average molecular weights of about 900 to 2500.

The polyolefins employed in the instant process will also have a low alkylvinylidene isomer content, that is, less than about 10 percent alkylvinylidene. As used herein, the term "alkylvinylidene" or "alkylvinylidene isomer" is meant to indicate olefins having the formula:

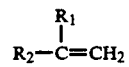

wherein $R_1$ is lower alkyl of 1 to about 6 carbon atoms and $R_2$ is a polyolefin residue. Consequently, high alkylvinylidene polyolefins having greater than about a 10 percent alkylvinylidene content, such as the commercially available Ultravis type of polyisobutene, are unsuitable for use in the process of the present invention, since such materials tend to form copolymers with maleic anhydride in the presence of a free radical initiator.

In general, the ratio of Weight average molecular weight ($M_W$) to number average molecular weight ($M_N$), that is, $M_W/M_N$, for the polyolefins employed in the present invention will fall within the range of about 1.1 to 4.0. The $M_W$ and $M_N$ values for the polyolefins used in this invention are determined by gel permeation chromatography (GPC) as described, for example, in U.S. Pat. No. 4,234,435 to Meinhardt et al.

As noted above, the present invention relates to a unique one-step process for preparing an alkenyl succinic anhydride having greater than 1.2 succinic groups per alkenyl group, which involves reacting a polyolefin with maleic anhydride in the presence of a free radical initiator to give an alkenyl succinic anhydride having an average of greater than 1.2 succinic groups per alkenyl group.

Accordingly, in the process of the instant invention, the polyolefin and maleic anhydride are heated in the presence of a free radical initiator to a temperature in the range of about 80° C. to about 220° C., preferably about 120° C. to about 180° C., more preferably about 140° C. to about 180° C., and most preferably, about 145° C. to about 165° C. The time of reaction will vary, depending in part upon the reaction temperature, but will generally be less than 20 hours, preferably about 1 to 15 hours. The reaction pressure can be atmospheric, although higher pressures up to about 50 psig are preferred. The molar ratio of maleic anhydride to polyolefin will generally be about 1.0:1 to about 9:1, preferably about 1:5:1 to about 5:1, and more preferably about 2:1 to about 4:1. Upon completion, this reaction will preferably result in greater than about a 50 percent conversion of polyolefin to alkenyl succinic anhydride.

The reaction involved in the present process can be carried out in the presence or absence of a solvent which is inert to the reaction taking place. When employed, suitable solvents include toluene, xylene, $C_9$ aromatics, neutral oil, and the like. Preferably, the reaction is carried out without a solvent.

The alkenyl succinic anhydride produced by the present process will contain an average of greater than about 1.2 succinic groups per alkenyl group, preferably at least about 1.3, more preferably from about 1.3 to 4.0, and most preferably about 1.3 to 2.5 succinic groups per alkenyl group.

In general, the process of the present invention can be initiated by any free radical initiator. Such initiators are well known in the art. However, the choice of free radical initiator may be influenced by the reaction temperature employed.

It has now been found that if the half-life of the decomposition of the free radical initiator at the temperature of reaction is in the range of about 5 minutes to 10 hours, preferably about 10 minutes to 5 hours, and more preferably about 10 minutes to 2 hours, then the desired alkenyl succinic anhydride product can be effectively prepared in high yields and conversions at short reaction times.

The preferred free-radical initiators are the peroxide-type initiators and azo-type initiators.

The peroxide-type free-radical initiator can be organic or inorganic, the organic having the general formula: $R_3OOR_3'$ where $R_3$ is any organic radical and $R_3'$ is selected from the group consisting of hydrogen and any organic radical. Both $R_3$ and $R_3'$ can be organic radicals, preferably hydrocarbon, aroyl, and acyl radicals, carrying, if desired, substituents such as halogens, etc. Preferred peroxides include di-tert-butyl peroxide, tert-butyl peroxybenzoate, and dicumyl peroxide.

Examples of other suitable peroxides, which in no way are limiting, include benzoyl peroxide; lauroyl peroxide; other tertiary butyl peroxides; 2,4-dichlorobenzoyl peroxide; tertiary butyl hydroperoxide; cumene hydroperoxide; diacetyl peroxide; acetyl hydroperoxide; diethylperoxycarbonate; tertiary butyl perbenzoate; and the like.

The azo-type compounds, typified by alpha, alpha'-azo-bisisobutyronitrile (AIBN), are also well-known free-radical promoting materials. These azo compounds can be defined as those having present in the molecule the group —N=N— wherein the balances are satisfied by organic radicals, at least one of which is preferably attached to a tertiary carbon. Other suitable azo compounds include, but are not limited to, p-bromobenzenediazonium fluoborate; p-tolyldiazoamino-benzene; p-bromobenzenediazonium hydroxide; azomethane and phenyldiazonium halides. A suitable list of azo-type compounds can be found in U.S. Pat. No. 2,551,813, issued May 8, 1951 to Paul Pinkney.

The half-life values for known free radical initiators at various temperatures are readily available from the literature. See, for example, C. Walling, "Free Radicals in Solution", John Wiley and Sons, Inc., New York (1957). Alternatively, the half-life values are available from the various suppliers of free radical initiators, such as Witco, Atochem, Lucidol, Phillips Petroleum, and the like. Table 1 lists the half-life temperatures for a number of free radical initiators at a given half-life. The half-life temperature is the temperature required for a free radical initiator to exhibit a specified half-life. As a rule, the higher the half-life temperature, the lower the half-life of the free radical initiator.

TABLE 1

HALF-LIFE TEMPERATURES OF VARIOUS FREE RADICAL INITIATORS AT SPECIFIED HALF-LIVES

| Initiator | Half-Life Temperature, °C. | | | | |
|---|---|---|---|---|---|
| | 5 Min. | 10 Min. | 2 Hrs. | 5 Hrs. | 10 Hrs. |
| Dialkyl Peroxides: | | | | | |
| di-t-butyl peroxide | 173 | 166 | 143 | 135 | 129 |
| di-t-amyl peroxide | 167 | 160 | 137 | 129 | 123 |
| di-cumyl peroxide | 161 | 154 | 131 | 123 | 117 |
| 2, 5-dimethyl-2, 5-di(t-butylperoxy) hexane | 164 | 157 | 134 | 126 | 120 |
| Peroxyketals: | | | | | |
| 1, 1-di-tannylperoxy-cyclohexane | 134 | 128 | 106 | 99 | 93 |
| Diperoxycarbonates: | | | | | |
| di-ethylhexylperoxy-dicarbonate | 85 | 79 | 60 | 54 | 49 |
| Diacyl Peroxides: | | | | | |
| didecanoyl peroxide | 102 | 96 | 76 | 69 | 64 |
| dibenzoyl peroxide | 114 | 108 | 86 | 78 | 73 |
| Peroxy Esters: | | | | | |
| t-butyl peroctoate | 115 | 109 | 90 | 82 | 77 |
| t-butyl perbenzoate | 152 | 144 | 119 | 110 | 104 |
| Azo Compounds: | | | | | |
| AIBN | 105 | 98 | 78 | 72 | 65 |

The amount of initiator to employ depends to a large extent on the particular initiator chosen, the olefin used and the reaction conditions. The initiator should generally be soluble in the reaction medium. The usual concentrations of initiator are between 0.001:1 and 0.4:1 moles of initiator per mole of polyolefin reactant, with preferred amounts between 0.005:1 and 0.20:1.

In carrying out the process of the invention, a single free radical initiator or a mixture of free radical initiators may be employed. For example, it may be desirable to add an initiator having a low decomposition temperature as the mixture is warming to reaction temperature, and then add an initiator having a higher decomposition temperature as the mixture reaches higher reaction temperatures. Alternatively, a combination of initiators could both be added prior to heating and reaction. In this case, an initiator having a high decomposition temperature would initially be inert, but would later become active as the temperature rose.

The initiator may also be added over time. For example, if an initiator is chosen with a short half-life, e.g., 5-20 minutes, at the reaction temperature, then the initiator may be added over a period of time so that an adequate concentration of free radicals will be available throughout the reaction period to give improved yields of the desired product.

In general, after the reaction is deemed complete, for example, by NMR analysis, the reaction mixture is heated to decompose any residual initiator. For a di(t-butyl) peroxide initiator, this temperature is typically about 160° C. or higher.

As used herein, the term "multiple adduction" refers to the alkenyl succinic anhydride reaction product of maleic anhydride and polyolefin, wherein more than one molecule of maleic anhydride is bonded to one molecule of polyolefin.

The average level of multiple adduction can be calculated from the saponification number (mg KOH per gram of sample) and the actives content of the alkenyl succinic anhydride product and the molecular weight of the starting polyolefin. By "average level of multiple adduction" is meant the average number of succinic groups per polyolefin group in the alkenyl succinic anhydride product. For example, an average multiple adduction level of 1.0 indicates an average of one succinic group per polyolefin group in the alkenyl succinic anhydride product. Likewise, an average multiple adduction level of 1.35 indicates an average of 1.35 succinic groups per polyolefin group in the alkenyl succinic anhydride product, and so forth.

The actives content of the alkenyl succinic anhydride product is measured in terms of the actives fraction, wherein an actives fraction of 1.0 is equivalent to 100 percent actives. Accordingly, an actives fraction of 0.5 would correspond to 50 percent actives.

The average level of multiple adduction for the alkenyl succinic anhydride product of maleic anhydride and polyolefin can be calculated in accordance with the following equation:

$$\text{Average Level of Multiple Adduction} = \frac{M_{PO} \times P}{(C \times A) - (M_{MA} \times P)}$$

wherein
P = saponification number of the alkenyl succinic anhydride sample (mg KOH/g)
A = actives fraction of the alkenyl succinic anhydride sample
$M_{PO}$ = number average molecular weight of the starting polyolefin
$M_{MA}$ = molecular weight of maleic anhydride
C = conversion factor = 112220 (for conversion of gram-moles of alkenyl succinic anhydride per gram of sample to milligrams of KOH per gram of sample)

The saponification number, P, can be measured using known procedures, for example, as described in ASTM D94.

The actives fraction of the alkenyl succinic anhydride can be determined from the percent of unreacted polyolefin according to the following procedure. A 5.0 gram sample of the reaction product of maleic anhydride and polyolefin is dissolved in hexane, placed in a column of 80.0 grams of silica gel (Davisil 62, a 140 angstrom pore size silica gel), and eluted with 1 liter of hexane. The percent unreacted polyolefin is determined by removing the hexane solvent under vacuum from the eluent and weighing the residue. Percent unreacted polyolefin is calculated according to the following formula:

$$\text{Percent Unreacted Polyolefin} = \frac{\text{Net Weight of Residue}}{\text{Sample Weight}} \times 100$$

The weight percent actives for the alkenyl succinic anhydride product is calculated from the percent unreacted polyolefin using the formula:

$$\text{Weight Percent Actives} = 100 - \text{Percent Unreacted Polyolefin}$$

The actives fraction of the alkenyl succinic anhydride is then calculated as follows:

$$\text{Actives Fraction} = \frac{\text{Weight Percent Actives}}{100}$$

The percent conversion of polyolefin is calculated from the weight percent actives as follows:

$$\text{Percent Conversion} = \frac{\text{wt. \% actives} \times \left( \frac{M_{po}}{M_{po} + [M_{ma} \times MADD]} \right)}{\left[ \text{wt. \% actives} \times \left( \frac{M_{po}}{M_{po} + [M_{ma} \times MADD]} \right) \right] + \left[ 100 - \text{wt. \% actives} \right]}$$

wherein
$M_{po}$ = number average molecular weight of the starting polyolefin
$M_{ma}$ = molecular weight of maleic anhydride
MADD = average level of multiple adduction It is, of course, understood that alkenyl succinic anhydride products having high average levels of multiple adduction, as prepared by the process of the present invention, can also be blended with other alkenyl succinic anhydrides having a lower average level of multiple adduction, for example, a level of around 1.0, to provide an alkenyl succinic anhydride product having an intermediate average level of mutliple adduction.

The following examples are offered to specifically illustrate this invention. These examples and illustrations are not be construed in any way as limiting the scope of this invention.

EXAMPLES

Example 1

1000 grams (0.77 mole) of polyisobutene having a number average molecular weight of 1300 and a methylvinylidene isomer content of about 6 percent was charged to a reactor and heated to 150° C. and stirred at 60 rpm with a mechanical stirrer. To this was added a mixture of 11.2 grams (0.077 mole) of di-t-butylperoxide, 120 grams of Chevron 100NR diluent oil, and a total of 150.90 grams (1.54 moles) of maleic anhydride over a four hour period. Then the reaction was held at 150° C. for an additional one hour. Any unreacted maleic anhydride was removed in vacuo at 190° C. The product was then filtered. The resulting polyisobutenyl succinic anhydride product had a saponification number of 47.7 mg KOH/gram of sample, 31 weight percent actives, and an average of about 2.06 succinic groups per polyisobutenyl group. The conversion of polyisobutene was about 28.0 percent. The half-life of the di-t-butylperoxide free radical initiator at the reaction temperature of 150° C. is about 1 hour.

Example 2

The procedure of Example 1 was followed, using 2648 grams (2.04 moles) of 1300 molecular weight polyisobutene, 389.4 grams (4.08 moles) of maleic anhydride, 29.8 grams (0.204 mole) of di-t-butylperoxide, and 318 grams of Chevron 100NR diluent oil. The resulting polyisobutenyl succinic anhydride product had a saponification number of 63.8 mg KOH/gram of sample, 45 weight percent actives, and an average of 1.87 succinic groups per polyisobutenyl group. The conversion of polyisobutene was about 41.8 percent.

Example 3

The procedure of Example 1 was followed, using 2167 grams (1.67 moles) of 1300 molecular weight polyisobutene, 326.97 grams (3.34 moles) of maleic anhydride, 24.34 grams (0.167 moles) of di-t-butylperoxide, and 260 grams of Chevron 100NR diluent oil. The resulting polyisobutenyl succinic anhydride product had a saponification number of 63.8 mg KOH/gram of sample, 45 weight percent actives, and an average of 1.87 succinic groups per polyisobutenyl group. The conversion of polyisobutene was about 41.8 percent.

Example 4

The procedure of Example 1 was followed, using 1600 grams (1.23 moles) of 1300 molecular Weight polyisobutene, 193 grams (1.97 moles) of maleic anhydride and 28 grams (0.192 mole) of di-t-butylperoxide. In addition, 300 grams of a C9 aromatic solvent was used instead of the Chevron 100NR diluent oil and the reaction time was 14 hours instead of 5 hours. The resulting polyisobutenyl succinic anhydride product had a saponification number of 84.2 mg KOH/gram of sample, 60.4 weight percent actives, and an average of 1.84 succinic groups per polyisobutenyl group. The conversion of polyisobutene was about 57.3 percent.

Example 5

The procedure of Example 1 was followed, using 60,700 grams (46.7 moles) of 1300 molecular weight polyisobutene, 4,560 grams (46.7 moles) of maleic anhydride and 681.7 grams (4.67 moles) of di-t-butylperoxide. No solvent was used and the reaction time was 11 hours. The resulting polyisobutenyl succinic anhydride product had a saponification number of 46.5 mg KOH/gram of sample, 44.4 weight percent actives, and an average of 1.34 succinic groups per polyisobutenyl group. The conversion of polyisobutene was about 42.0 percent.

Example 6

The procedure of Example 1 was followed, using 61,900 grams (47.6 moles) of 1300 molecular weight polyisobutene, 9,332.6 grams (95.2 moles) of maleic anhydride and 695.2 grams (4.76 moles) of di-t-butylperoxide. No solvent was used and the reaction time was 14 hours. The resulting polyisobutenyl succinic anhydride product had a saponification number of 94.5 mg KOH/gram of sample, 65.4 weight percent actives, and an average of 1.92 succinic groups per polyisobutenyl group. The conversion of polyisobutene was about 62.3 percent.

Example 7

The procedure of Example 1 was followed, using 42,800 grams (19.5 moles) of a polyisobutene having a number average molecular weight of 2200 and a methylvinylidene isomer content of less than 2 percent, 4,294 grams (43.8 moles) of maleic anhydride and 523 grams (3.58 moles) of di-t-butylperoxide. No solvent was used and the reaction time was 14 hours. The resulting polyisobutenyl succinic anhydride product had a saponification number of 41.7 mg KOH/gram of sample, 59 weight percent actives, and an average of 1.46 succinic groups per polyisobutenyl group. The conversion of polyisobutene was about 57.5 percent.

COMPARATIVE EXAMPLES

Comparative Example 1

This example follows the procedure of U.S. Pat. No. 3,367,864, Example I, part (1).

To a 2-liter 3-necked flask equipped with a thermometer, nitrogen inlet, condensor and stirrer was added 400.0 grams (0.355 mole) of a polyisobutene having a number average molecular weight of about 1100 and a methylvinylidene isomer content of about 2 percent, 38.27 grams (0.39 mole) of maleic anhydride, 6.89 grams (0.047 mole) of di-t-butylperoxide, and 210 ml. of toluene as a solvent. This mixture was stirred and heated at reflux (110° C.) for a period of 30 hours. Then the toluene was removed in vacuo, and the product was dissolved in 250 ml. of hexane and filtered to remove the unreacted maleic anhydride. The hexane was then removed in vacuo. The resulting polyisobutenyl succinic anhydride product had a saponification number of 29.2 mg KOH/gram of sample, 16.24 weight percent actives, and an average of about 2.09 succinic groups per polyisobutenyl group. The conversion of polyisobutene was about 14.1 percent. The half-life of the di-t-butylperoxide free radical initiator at the reaction temperature of 110° C. is about 120 hours.

Comparative Example 2

The procedure of Comparative Example 1 was repeated. The resulting polyisobutenyl succinic anhydride product had a saponification number of 7.7 mg KOH/gram of sample, 4.7 weight percent actives, and an average of about 1.87 succinic groups per polyisobutenyl group. The conversion of polyisobutene was about 4.1 percent.

Comparative Example 3

The procedure of Comparative Example 1 was followed, using 330 grams (0.35 mole) of a polyisobutene having a number average molecular weight of about 950 and a methylvinylidene isomer content of about 2 percent, 32.3 grams (0.33 moles) of maleic anhydride, 5.8 grams (0.040 mole) of di-t-butylperoxide, and 210 ml. of toluene as a solvent. The resulting polyisobutenyl succinic anhydride product had a saponification number of 87.3 mg KOH/gram of sample, 48 weight percent actives, and an average of about 1.83 succinic groups per polyisobutenyl group. The conversion of polyisobutene was about 43.7 percent.

Comparative Example 4

The procedure of Comparative Example I was followed, using 390 grams (0.30 mole) of polyisobutene having a number average molecular weight of about 1300 and a methylvinylidene isomer content of about 6 percent, 32.3 grams (0.33 mole) of maleic anhydride, 5.8 grams (0.040 mole) of di-t-butylperoxide, and 210 ml. of toluene as a solvent. The resulting polyisobutenyl succinic anhydride product had a saponification number of 53.9 mg KOH/gram of sample, 43 weight percent actives, and an average of about 1.63 succinic groups per polyisobutenyl group. The conversion of polyisobutene was about 40.2 percent.

Comparative Example 5

The procedure of Comparative Example 1 was followed, using 330 grams (0.35 mole) of 950 molecular weight polyisobutene, 32.3 grams (0.33 mole of maleic anhydride and 5.8 grams (0.040 mole) of di-t-butylperoxide. In addition, 210 ml. of xylene was used as a solvent instead of toluene and the reaction temperature was 114° C. instead of 110° C. The resulting polyisobutenyl succinic anhydride product had a saponification number of 80.9 mg KOH/gram of sample, 43 weight percent actives, and an average of about 1.90 succinic groups per polyisobutenyl group. The conversion of polyisobutene was about 38.7 percent.

Comparative Examples 1-5 show that the use of a di-t-butylperoxide initiator at the reaction temperature of 110° C. gives conversions of only 4.1 to 43.7 percent, even at the relatively long reaction time of 30 hours.

Comparative Example 6

To a 2-liter flask equipped with a stirrer, thermometer and condensor was added 384.6 grams (0.405 mole) of a polyisobutene having a number average molecular weight of 950 and a methylvinylidene isomer content of about 2 percent, 119 grams 1.215 moles) of maleic anhydride and 250 ml. of toluene as a solvent. This mixture was heated to reflux (110° C.) and to this was added a total of 15.5 grams (0.081 mole) of alpha, alpha'-azobisisobutyronitrile (AIBN) over a period of four hours. The reaction was heated for a total of six hours. The product was then cooled, placed into a separatory funnel and the top phase was separated and filtered to remove excess maleic anhydride. The toluene was then removed in vacuo. The resulting polyisobutenyl succinic anhydride product had a saponification number of 24.3 mg KOH/gram of sample, 13 weight percent actives, and an average of 1.89 succinic groups per polyisobutenyl group. The conversion of polyisobutene was about 11.1 percent. The half-life of the AIBN free radical initiator at the reaction temperature of 110° C. is about 3 minutes. This example shows that the use of a free radical initiator having a very short half-life at the temperature of reaction results in a low conversion of polyolefin.

What is claimed is:

1. A process for the preparation of an alkenyl-substituted succinic anhydride wherein the -alkenyl substituent has a number average molecular weight of from about 500 to 5000 and the average number of succinic groups per alkenyl group is greater than 1.2 which comprises reacting a polyolefin having an alkylvinylidene isomer content of less than about 10 percent and a number average molecular weight of about 500 to 5000 with maleic anhydride in the presence of a free radical initiator at a temperature in the range of about 80° C. to 220° C. for a period of less than 20 hours, wherein the molar ratio of maleic anhydride to polyolefin is about 1.0:1 to 9:1, and wherein the half-life of the decomposition of the free radical initiator is about 5 minutes to 10 hours at the reaction temperature.

2. The process according to claim 1, wherein the alkenyl succinic anhydride produced has an average of at least about 1.3 succinic groups per alkenyl group.

3. The process according to claim 2, wherein the alkenyl succinic anhydride produced has an average of about 1.3 to 4.0 succinic groups per alkenyl group.

4. The process according to claim 3, wherein the alkenyl succinic anhydride produced has an average of about 1.3 to 2.5 succinic groups per alkenyl group.

5. The process according to claim 1, wherein the polyolefin has a number average molecular weight of about 700 to 3000.

6. The process according to claim 5, wherein the polyolefin has a number average molecular weight of about 900 to 2500.

7. The process according to claim 1, wherein the polyolefin is a polybutene or polypropylene.

8. The process according to claim 7, wherein the polyolefin is a polyisobutene.

9. The process according to claim 8, wherein the polyisobutene has a number average molecular weight of about 900 to 2500.

10. The process according to claim 10, wherein the free radical initiator employed is a peroxide free radical initiator.

11. The process according to claim 10, wherein the peroxide free radical initiator is di-tert-butyl peroxide.

12. The process according to claim 1, wherein the molar ratio of maleic anhydride to polyolefin is about 2:1 to about 4:1.

13. The process according to claim 1, wherein the reaction is carried out at a temperature in the range of about 140° C. to about 180° C.

14. The process according to claim 13, wherein the reaction is carried out at a temperature in the range of about 145° C. to about 165° C.

15. The process according to claim 1, wherein the reaction is carried out for a period of about 1 to 15 hours.

16. The process according to claim 1, wherein the reaction is carried out in the absence of a solvent.

* * * * *